US008339046B2

(12) United States Patent
Kasaba et al.

(10) Patent No.: US 8,339,046 B2
(45) Date of Patent: Dec. 25, 2012

(54) LIGHTING CONTROL DEVICE OF LIGHTING DEVICE FOR VEHICLE

(75) Inventors: Yusuke Kasaba, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 331 days.

(21) Appl. No.: 12/645,729

(22) Filed: Dec. 23, 2009

(65) Prior Publication Data

US 2010/0181914 A1 Jul. 22, 2010

(30) Foreign Application Priority Data

Jan. 20, 2009 (JP) ................................ 2009-009587

(51) Int. Cl.
*B60Q 1/26* (2006.01)

(52) U.S. Cl. .......... 315/80; 315/302; 315/294; 307/10.8

(58) Field of Classification Search .................... 315/80, 315/82, 224, 291, 307, 302, 300, 294; 307/10.8
See application file for complete search history.

(56) References Cited

U.S. PATENT DOCUMENTS

| | | | | |
|---|---|---|---|---|
| 2007/0229001 | A1* | 10/2007 | McIntosh et al. | 315/307 |
| 2008/0197789 | A1* | 8/2008 | Shiotsu et al. | 315/297 |
| 2009/0273290 | A1* | 11/2009 | Ziegenfuss | 315/193 |
| 2010/0052569 | A1* | 3/2010 | Hoogzaad et al. | 315/294 |

FOREIGN PATENT DOCUMENTS

| | | |
|---|---|---|
| JP | 2008-198915 | 8/2008 |

* cited by examiner

*Primary Examiner* — Jacob Y Choi
*Assistant Examiner* — Ephrem Alemu
(74) *Attorney, Agent, or Firm* — Fish & Richardson P.C.

(57) ABSTRACT

A lighting control device of a lighting device for a vehicle includes a switching regulator for supplying a driving current to a semiconductor light source. The lighting control device also includes control means having a current detecting portion for detecting the driving current and serving to control dimming of the semiconductor light source in order to reduce a mean current of the driving current by repeating driving and stopping operations of the switching regulator at a high speed upon receipt of a dimming control signal. The current detecting portion has a current holding portion for holding the driving current, detected for a driving period of the switching regulator, for a stopping period after a passage of the driving period.

6 Claims, 9 Drawing Sheets

LIGHTING CONTROL DEVICE OF LIGHTING DEVICE FOR VEHICLE

CROSS-REFERENCE TO RELATED APPLICATION(S)

This application claims the benefit of priority of Japanese Patent Application No. 2009-009587, filed on Jan. 20, 2009, the disclosure of which is incorporated by reference herein in its entirety.

TECHNICAL FIELD

The present disclosure relates to a lighting control device of a lighting device for a vehicle and more particularly to a lighting control device of a lighting device for a vehicle which controls an ON operation of a semiconductor light source constituted by a semiconductor light emitting device.

BACKGROUND

Conventionally, there has been known a lighting device for a vehicle which uses a semiconductor light emitting device, for example, a light emitting diode (LED) as a semiconductor light source. A lighting control device for controlling an ON operation of the LED is mounted on the lighting device for a vehicle of this type.

The lighting control device includes a switching regulator for supplying a driving current to the LED and control means having a current detecting portion for detecting the driving current, and the control means repetitively supplies/cuts off a voltage to be supplied to the switching regulator upon receipt of a dimming control signal, thereby repeating driving and stopping operations at a high speed. Thus, a dimming operation of the LED is controlled to reduce a mean current of the driving current (for example, see Japanese Patent Document JP-A-2008-198915).

The switching regulator supplies a power of several tens of watts (W) to the LED and converts a source voltage (a battery voltage) into a suitable voltage for a forward voltage of the LED at a high efficiency in order to reduce a circuit loss. An error amplifier of the control means carries out a feedback control over the switching regulator (a lighting control of the LED) in such a manner that the driving current detected by the current detecting portion has a predetermined magnitude. In the feedback control, a reference voltage input to the error amplifier is compared with a voltage converting value of a DC current detected by the current detecting portion and they are controlled to be almost equal to each other.

In the case in which a light emission of a white LED is reduced (extinction), the reference voltage to be input to the error amplifier is lowered to reduce a DC current. When the DC current is lowered, however, there is caused a problem of a color shift (a white color is eliminated).

In order to solve the problem of the color shift, there has been known a PWM (Pulse Width Modulation) extinction method for turning ON/OFF the LED at a high speed (several hundreds hertz (Hz) to several kilohertz (kHz)).

In general, the PWM extinction method is executed by using a circuit configuration in which a current to the LED is limited by a resistor or a circuit configuration of constant current clamping/constant voltage clamping. In the circuit configurations, a switch element is inserted in series between the resistor and the LED, between the constant current clamp circuit and the LED and between the constant voltage clamp circuit and the LED, and ON/OFF operations are repeated at a desirable frequency and duty so that the PWM extinction method is implemented.

In the case in which the PWM extinction method is executed by using a switching regulator, however, an output voltage of the switching regulator is continuously raised to bring a high voltage state while the switch element is OFF when the same switch element as described above is inserted between the switching regulator and the LED. Thus, there is a possibility that a large current might flow to the LED the moment the switch element is turned ON, resulting in a failure of the LED.

SUMMARY

The present disclosure addresses the foregoing issues to prevent a failure of an LED with a simple structure, thereby enhancing safety.

A lighting control device of a lighting device for a vehicle, according to a first aspect, includes: a switching regulator for supplying a driving current to a semiconductor light source; and control means including a current detecting portion for detecting the driving current and serving to control dimming of the semiconductor light source in order to reduce a mean current of the driving current by repeating driving and stopping operations of the switching regulator at a high speed upon receipt of a dimming control signal. The current detecting portion has a current holding portion for holding the driving current, detected for a driving period of the switching regulator, for a stopping period after a passage of the driving period.

Therefore, it is possible to suppress a sudden rise in the driving current the moment there is carried out a transition from a stoppage of the driving operation to a start of the driving operation in the switching regulator.

Various implementations can provide one or more advantages.

For example, in some cases, it is possible to suppress a sudden rise in the driving current the moment there is carried out a transition from a stoppage of the driving operation to a start of the driving operation in the switching regulator. Therefore, it is possible to prevent a large LED current from flowing the moment the driving operation of the switching regulator is started. Accordingly, it is possible to prevent a failure of an LED, thereby enhancing safety.

In a second aspect, the control means has an error amplifier for comparing a voltage value based on a current value of the driving current with a predetermined reference voltage and carrying out a feedback control over an output of the switching regulator in such a manner that the voltage value based on the current value of the driving current is coincident with the reference voltage. The control means has a capacitor and a resistor which are connected in parallel and disposed between an input and an output of the error amplifier. A capacitance component of the capacitor is opened and the error amplifier is short-circuited through the resistor for the stopping period of the switching regulator.

Even if the output of the error amplifier is changed, accordingly, it is possible to prevent charging/discharging for the phase compensating capacitance component of the capacitor. Thus, it is possible to shorten a time required for a return to the driving current for obtaining desirable dimming. Therefore, it is possible to suppress a flicker of a light emission without a vertical oscillation of the driving current.

In a third aspect, a first switch portion for conducting/disconnecting the semiconductor light source and the switching regulator is disposed between the semiconductor light source and the switching regulator. The control means causes the first switch portion to carry out an OFF operation for the stopping period of the switching regulator.

Accordingly, the switching regulator is disconnected from the LED to prevent a discharge of a smoothing capacitor of the switching regulator for a period in which the driving current is not caused to flow to the LED. Therefore, it is possible to suppress a reduction in an output voltage of the switching regulator when a transition occurs to a period in which the driving current flows to the LED from a period in which the driving current does not flow to the LED.

In a fourth aspect, the control means has a lighting detecting portion for deciding whether or not the semiconductor light source is turned ON based on a value of the driving current detected by the current detecting portion and sending a lighting detection signal. A resistor is connected in series to the first switch portion, and a second switch portion is connected in parallel with the first switch portion and the resistor. The first switch portion and the second switch portion carry out ON/OFF operations based on the lighting detection signal and the dimming control signal.

In a recovery to a full lighting state from a light-out state caused by a contact failure, the first switch portion carries out an ON operation. An electric charge of the smoothing capacitor of the switching regulator having a voltage raised flows into the resistor connected in series to the first switch portion so that the driving current to the LED can be suppressed. Consequently, it is possible to prevent a failure of the LED, thereby enhancing a safety.

In a fifth aspect, the driving and stopping operations of the switching regulator are started in a timing for causing a switch element of the switching regulator to carry out an ON operation.

DETAILED DESCRIPTION OF THE DRAWINGS

A lighting control device of a lighting device for a vehicle according to a first embodiment of the invention will be described below with reference to FIGS. 1 to 3.

Figure 1:
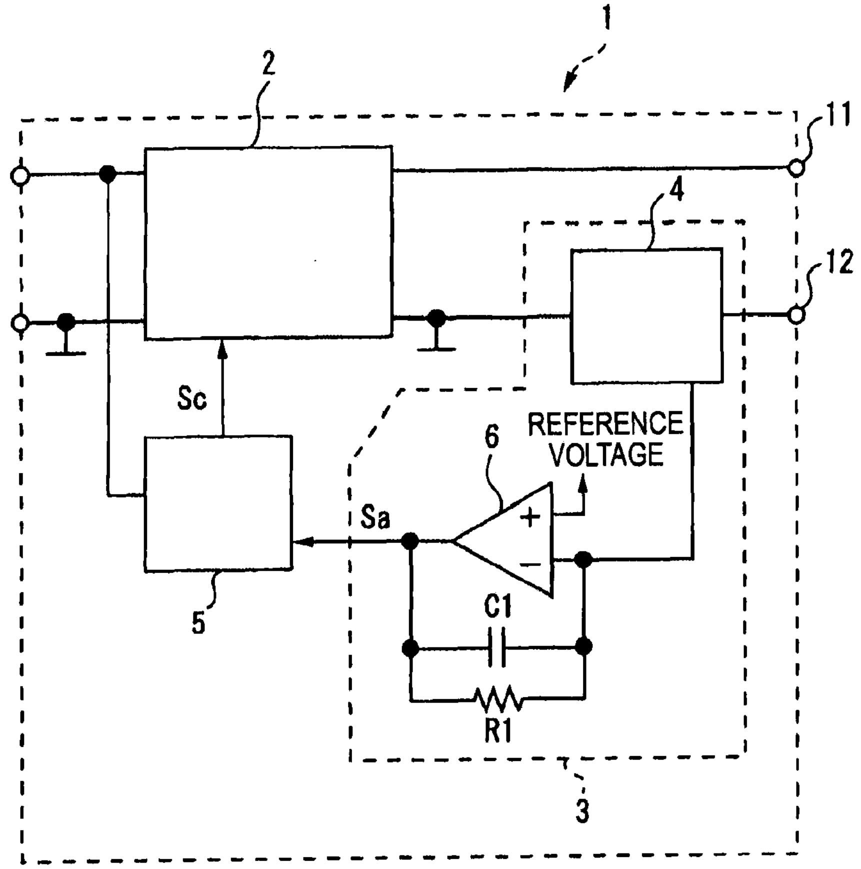
FIG. 1 illustrates an example of a lighting control device.

As shown in FIG. 1, a lighting control device 1 includes a switching regulator 2 for supplying a driving current (which will be hereinafter referred to as an "LED current") to an LED (not shown), a control portion 3 serving as control means for controlling dimming of the LED in order to reduce a mean current of the LED current upon receipt of a PWM extinction signal Sp (see FIG. 2) to be a dimming control signal, and a driving circuit 5 for sending a driving control signal Sc to the switching regulator 2.

The control portion 3 has a current detecting portion 4 for detecting the LED current, and an error amplifier 6 for comparing a current value of the LED current with a predetermined reference voltage and carrying out a feedback control over an output of the switching regulator 2 in such a manner that the current value of the LED current is coincident with the reference voltage.

Figure 3:
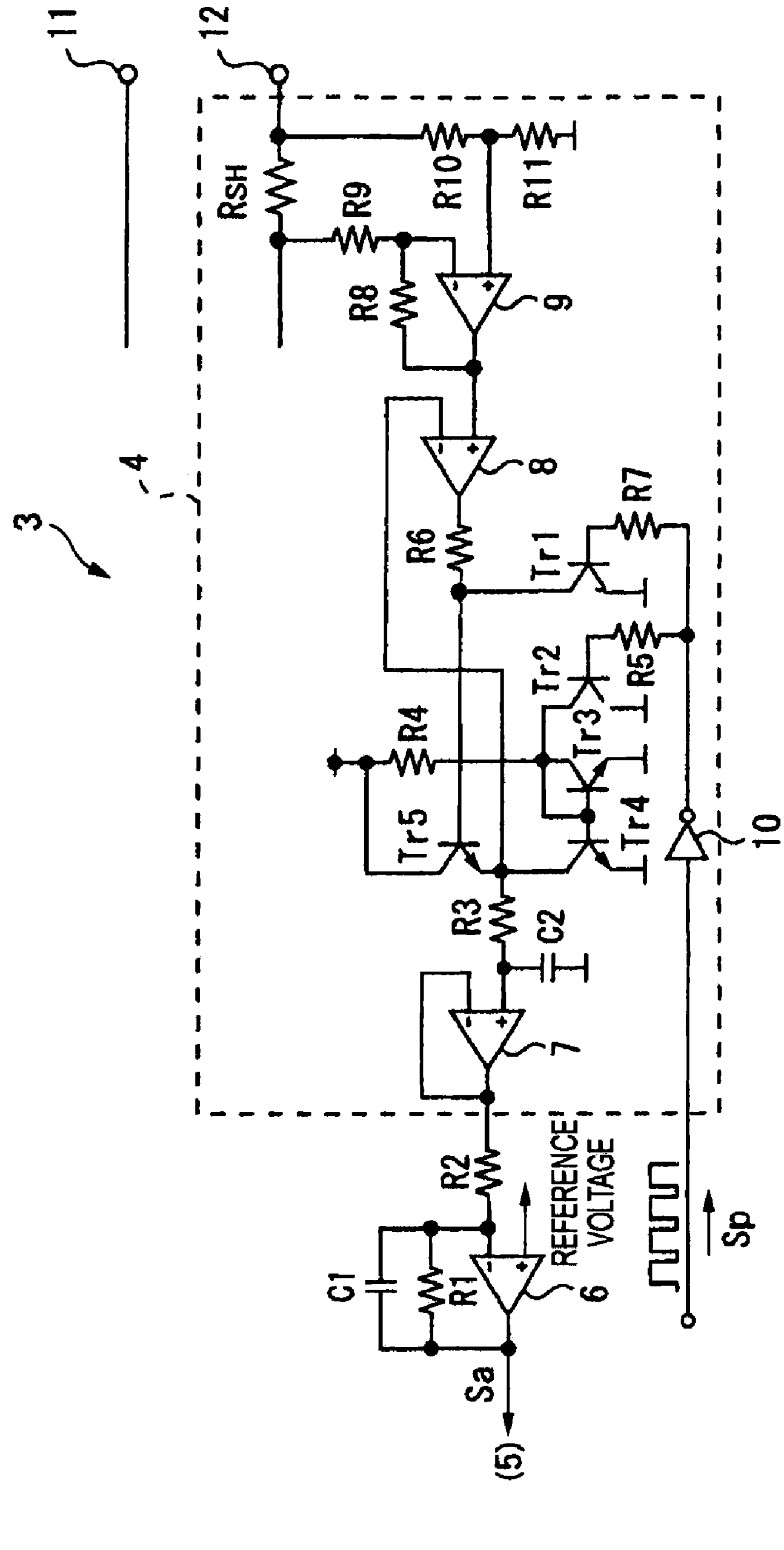
FIG. 3 illustrates an example of a control portion of a lighting control device.

As shown in FIG. 3, the current detecting portion 4 includes a shunt resistor $R_{SH}$ for detecting the LED current, amplifiers 7 to 9 for amplifying and transmitting a current detecting value of the LED current which is detected by the shunt resistor $R_{SH}$, a capacitor C2 serving as a current holding portion, and NPN transistors Tr1 to Tr5 for functioning as a charge/discharge inhibiting circuit for inhibiting the capacitor C2 from being charged/discharged when the PWM extinction signal Sp has a low level. The transistor Tr1 has a collector connected to a base of the transistor Tr5, and the transistor Tr2 has a collector connected to bases of the transistors Tr3 and Tr4. The capacitor C2 is connected to a non-inverting input of the amplifier 7. Output terminals 11 and 12 are connected to the LED.

An LED current detecting voltage obtained from the current detecting value through the amplifiers 7 to 9 is input to an inverting input of the error amplifier 6 and a predetermined reference voltage is input to a non-inverting input thereof. A resistor R1 and a capacitor C1 serving as a phase compensating capacitance component are connected in parallel between the inverting input and an output.

An operation of the control portion 3 will be described below. FIG. 2 is a diagram showing a relationship between a signal and a charge/discharge in the capacitor C2 for the PWM extinction signal Sp in the case in which there are carried out a transition from a period (a period A) in which the LED current flows to a period (a period B) in which the LED current does not flow, and furthermore, a transition from the period (the period B) in which the LED current does not flow to a period (a period C) in which the LED current flows.

The error amplifier 6 compares the LED current detecting voltage with the predetermined reference voltage and sends, to the driving circuit 5, an error signal Sa indicative of an error amount. Upon receipt of the error signal Sa, the driving circuit 5 controls a driving operation of the switching regulator 2 in such a manner that the LED current detecting voltage is equal to the reference voltage.

In the case in which the PWM extinction signal Sp having a high level is sent to the NPN transistors Tr1 and Tr2 through an inverter 10 (the period A in FIG. 2), the PWM extinction signal Sp having the low level is input to bases of the NPN transistors Tr1 and Tr2 so that both of the NPN transistors Tr1 and Tr2 carry out an OFF operation. In other words, the capacitor C2 is charged/discharged in such a manner that a capacitor voltage has the current detecting value.

In the case in which the PWM extinction signal Sp having the low level is sent to the NPN transistors Tr1 and Tr2 through the inverter 10 (the period B in FIG. 2), the PWM extinction signal Sp having the high level is input to the bases of the NPN transistors Tr1 and Tr2 so that both of the NPN transistors Tr1 and Tr2 carry out an ON operation and both of the NPN transistors Tr4 and Tr5 carry out the OFF operation. For this reason, the capacitor C2 is inhibited from being charged/discharged so that electric charges which have been charged are held exactly.

Accordingly, the LED detecting voltage obtained immediately before the transition from the period A to the period B is input to the non-inverting input of the error amplifier 6 the moment the transition from the period B to the period C is carried out. Therefore, the error amount of the non-inverting input from the inverting input (the reference voltage) is reduced very greatly. Therefore, the output of the error amplifier 6 can be prevented from being suddenly raised the moment there is a transition from the period B in which the driving operation of the switching regulator 2 is stopped to the period C in which a driving start state is brought through the transmission of the PWM extinction signal Sp having the low level. Accordingly, a large LED current can be prevented from flowing the moment the transition from the period B to the period C is carried out to start the driving operation of the switching regulator 2.

Next, a lighting control device of a lighting device for a vehicle according to a second embodiment of the invention will be described with reference to FIGS. 4 and 5. Since a structure and an operation of a current detecting portion 4 of a control portion 14 constituting the lighting control device according to the second embodiment are the same as those in the first embodiment, a description of a current detecting portion will be omitted.

Figure 4:
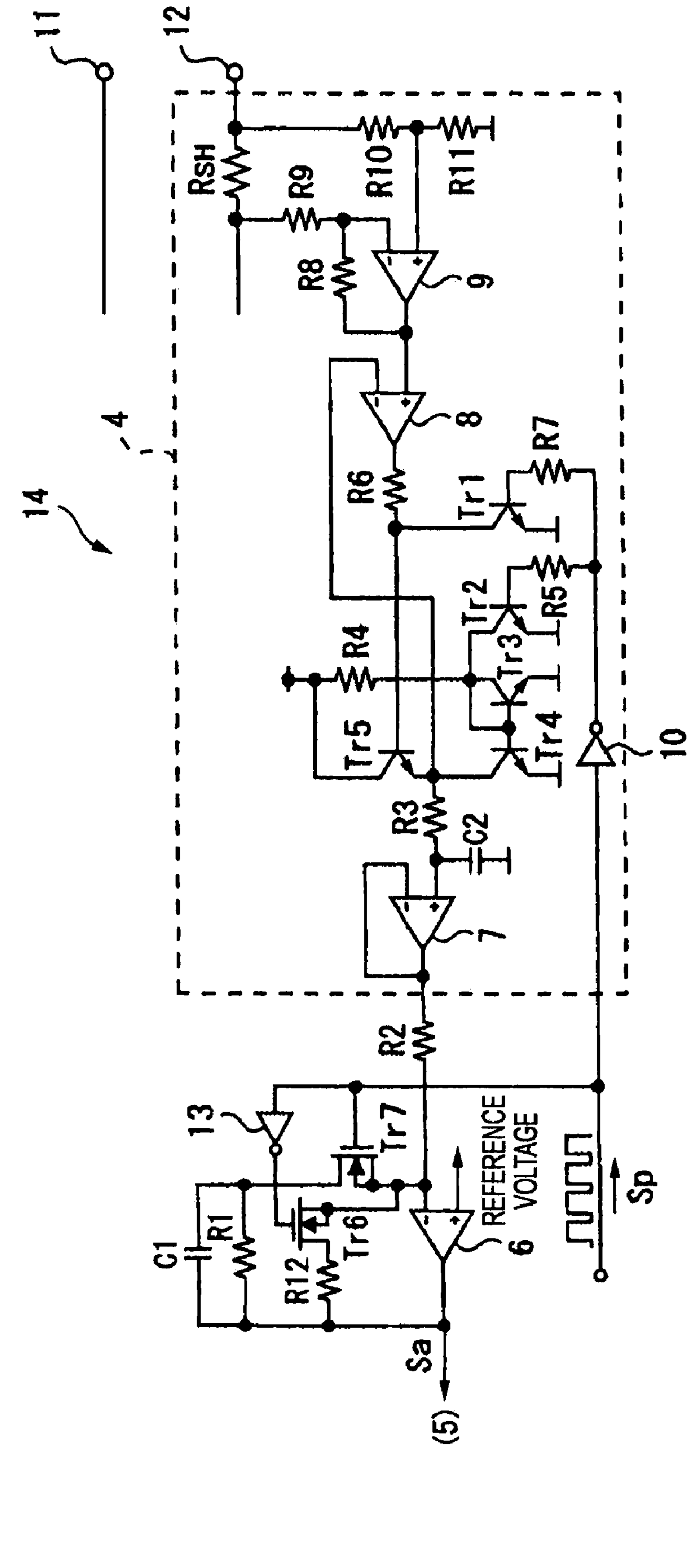
FIG. 4 illustrates an example of a control portion of a lighting control device.
Figure 5:
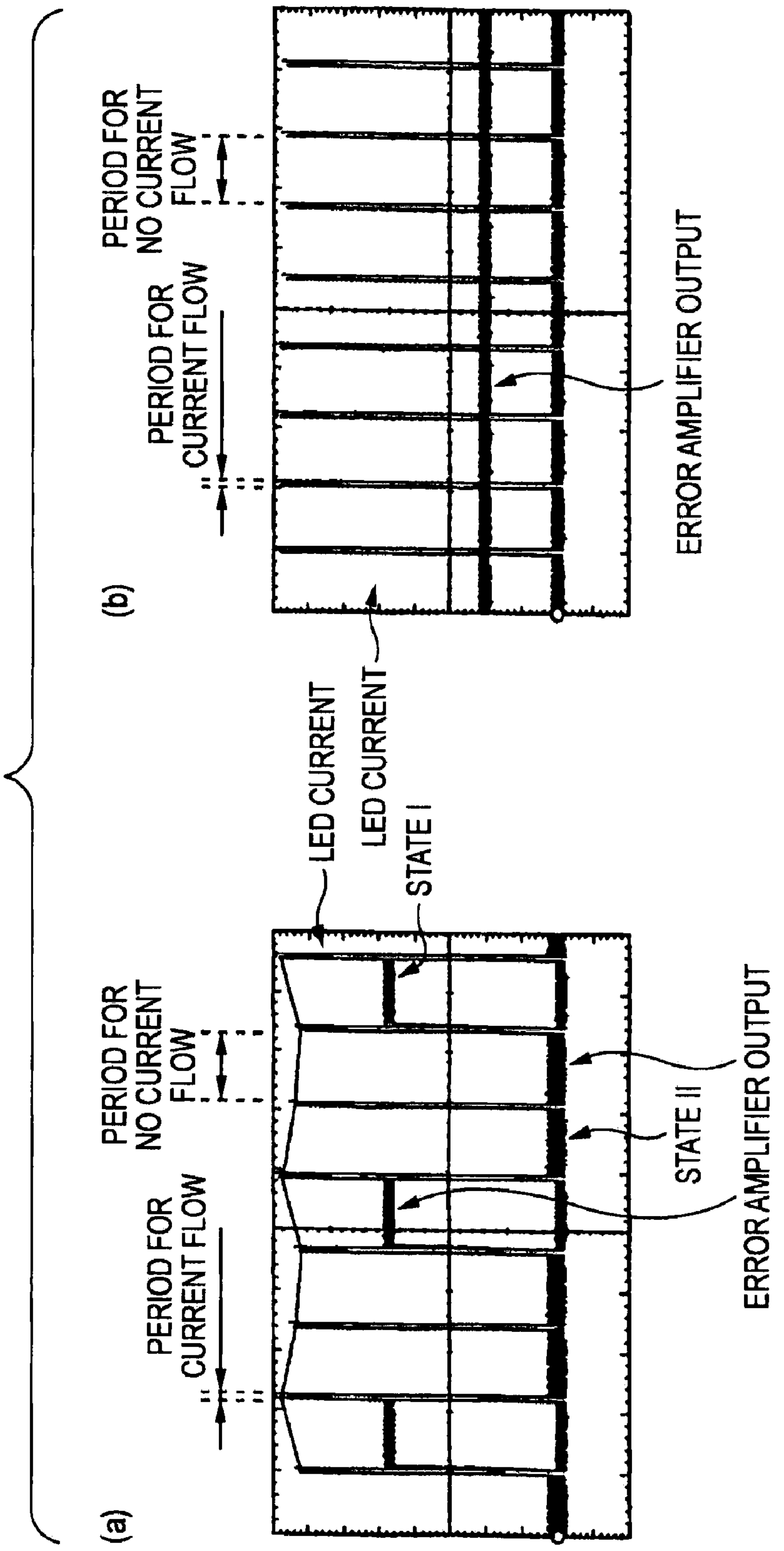
FIGS. 5A-5B are signal timing diagrams.

As shown in FIG. 4, sources of NMOS transistors Tr6 and Tr7 are connected to an inverting input of an error amplifier 6 and an LED detecting voltage is input thereto. A predetermined reference voltage is input to a non-inverting input of the error amplifier 6.

One of the terminals of each of a capacitor C1 serving as a phase compensating capacitance component and a resistor R1 is connected to a drain of the NMOS transistor Tr6 through a feedback resistor R12 and the other terminal thereof is connected to a drain of the NMOS transistor Tr7.

A PWM extinction signal Sp is input to a gate of the NMOS transistor Tr6 through an inverter 13 and to a gate of the NMOS transistor Tr7.

FIG. 5A is a diagram showing a state of the LED current and the output of the error amplifier 6 in the case in which the LED current detecting voltage is input to the inverting input of the error amplifier 6 according to the first embodiment. FIG. 5B is a diagram showing a state of an LED current and an output of the error amplifier 6 in the case in which the LED current detecting voltage is input to the inverting input of the error amplifier 6 according to the second embodiment. In FIGS. 5A and 5B, a lighting duty ratio of the LED is set to be approximately 5% and an amplification factor (a gain) of the error amplifier 6 is set to be greater than 100.

In the case in which the LED current detecting voltage is input to the inverting input of the error amplifier 6 in the control portion 3 and the amplification factor of the error amplifier 6 is great according to the first embodiment, the output of the error amplifier 6 is increased or reduced for a period in which the LED current does not flow as shown in FIG. 5A. The reason for this is that the LED detecting voltage and the reference voltage are perfectly coincident with each other in rare cases and a predetermined error is made between both of them.

More specifically, the LED current is increased when there is a transition to a period in which the current flows to the LED after a state (a state I) in which the output of the error amplifier 6 is high. The LED current is reduced when there is a transition to the period in which the current flows to the LED after a state (a state II) in which the output of the error amplifier 6 is low. A vertical oscillation of the LED current might cause a flicker of a light emission.

The lighting control device according to the second embodiment can suppress the visual flicker of the light emission.

An operation of the control portion 14 will be described below.

In order to cause the LED current to flow to the LED, the NMOS transistor Tr6 carries out an OFF operation when the PWM extinction signal Sp having the high level is input to the gate of the NMOS transistor Tr6 through the inverter 13. The NMOS transistor Tr7 carries out an ON operation when the PWM extinction signal Sp having the high level is input to the gate of the NMOS transistor Tr7. At this time, the operation of the control portion 14 is entirely the same as that of the control portion 3 according to the first embodiment. The state is continuously maintained for the period in which the LED current flows to the LED in FIG. 5B.

In order to prevent the LED current from flowing to the LED, the NMOS transistor Tr6 carries out an ON operation when the PWM extinction signal Sp having the low level is input to the gate of the NMOS transistor Tr6 through the inverter 13. The NMOS transistor Tr7 carries out an OFF operation when the PWM extinction signal Sp having the low level is input to the gate of the NMOS transistor Tr7.

In other words, for the period in which the LED current does not flow to the LED (the PWM extinction signal has the low level), the NMOS transistor Tr6 has a switch function for setting the feedback resistor R12 and the NMOS transistor Tr7 has a switch function for blocking a feedback of the capacitor C1 and the resistor R1 in the error amplifier 6.

The NMOS transistor Tr6 reduces the amplification factor of the error amplifier 6 for the period in which the LED current does not flow to the LED. Even if a slight error is made in the input of the error amplifier 6, accordingly, the output can be prevented from being greatly changed.

The NMOS transistor Tr7 blocks the feedback for the period in which the LED current does not flow to the LED and thus opens the phase compensating capacitance component of the capacitor C1. Even if the output of the error amplifier 6 is changed, consequently, it is possible to prevent the phase compensating capacitance component of the capacitor C1 from being charged/discharged. Thus, it is possible to shorten a time required for a return to the LED current to obtain desirable dimming. Accordingly, the LED current has no vertical oscillation so that the flicker of the light emission is not caused as shown in FIG. 5B.

A lighting control device of a lighting device for a vehicle according to a third embodiment of the invention will be described below with reference to FIGS. 6 to 9. Since the structure and operation of a current detecting portion 4, a driving circuit 5 and an error amplifier 6 which constitute the lighting control device according to the third embodiment are the same as those in the first embodiment, a description of those structures will be omitted.

Figure 6:
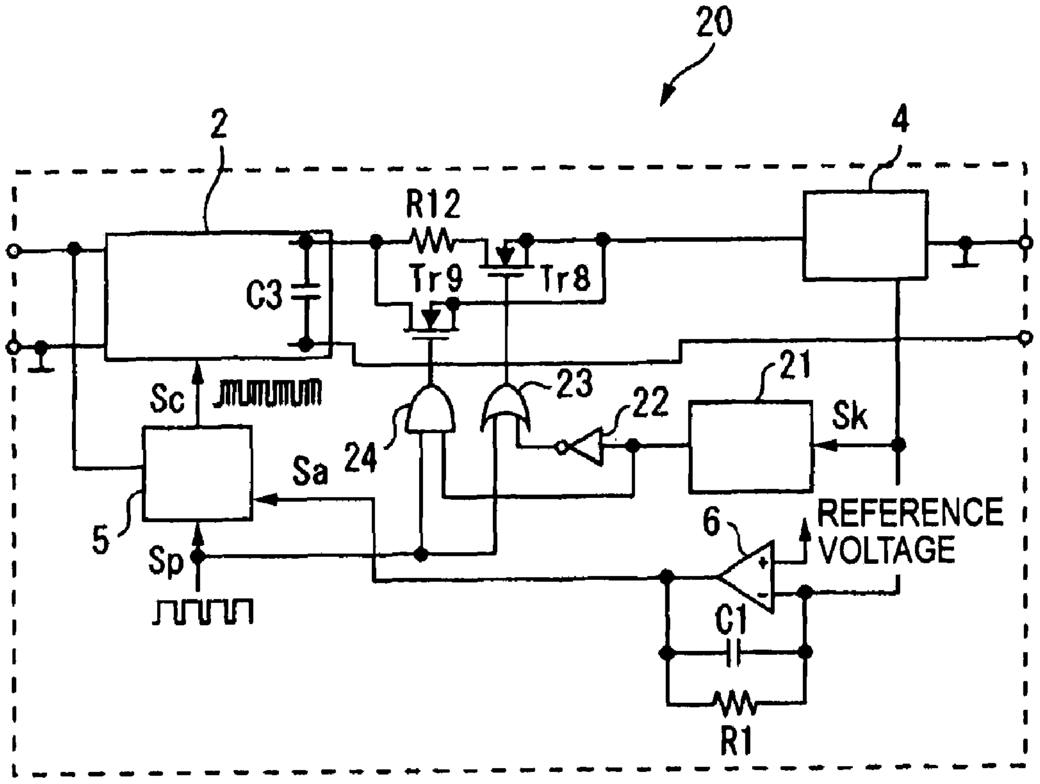
FIG. 6 illustrates an example of a lighting control device.

As shown in FIG. 6, a lighting control device 20 includes: a switching regulator 2 having a smoothing capacitor C3 on an output side and serving to supply an LED current; the current detecting portion 4 for detecting the LED current; the driving circuit 5 for sending a driving control signal Sc to the switching regulator 2; the error amplifier 6 for comparing a current value of the LED current with a predetermined reference voltage and for carrying out a feedback control over the output of the switching regulator 2 in such a manner that the current value of the LED current is coincident with the reference voltage; and a lighting detecting portion 21 for deciding lighting/light-out of an LED upon receipt of a current detecting signal Sk of the LED current.

A resistor R12 and an NMOS transistor Tr8 to be a first switch portion are provided on a high side output of the switching regulator 2. An NMOS transistor Tr9 to be a second switch portion is connected in parallel with the resistor R12 and the NMOS transistor Tr8. An OR circuit 23 is connected to a gate of the NMOS transistor Tr8, and an AND circuit 24 is connected to a gate of the NMOS transistor Tr9. An inverter 22 is connected between the OR circuit 23 and the lighting detecting portion 21. A PWM extinction signal Sp is input to one of two inputs in each of the OR circuit 23 and the AND circuit 24. In the third embodiment, the switching regulator 2 is a negative polarity output, and a low side output has a negative polarity and a high side output has a GND potential.

Figure 2:
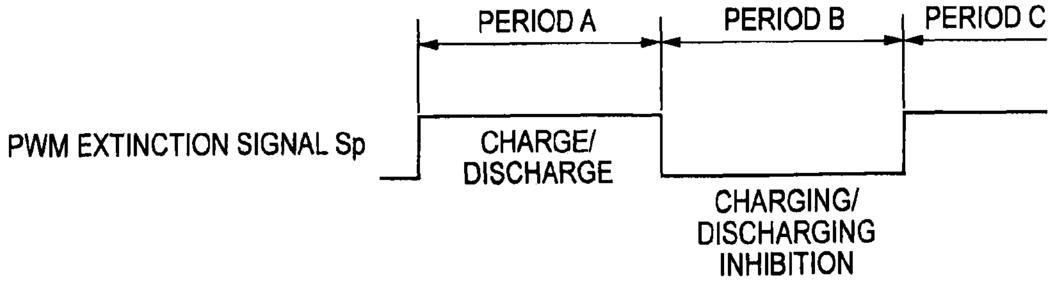
FIG. 2 is a signal timing diagram.

In order to cause the LED current for obtaining desirable dimming to flow to the LED the moment there is carried out the transition from the period B to the period C shown in FIG. 2, it is desirable that a voltage on both terminals of the smoothing capacitor C3 should be equal to a voltage for the period A. In the lighting control device 1 according to the first embodiment, however, there is a possibility that the electric charges of the smoothing capacitor C3 might flow to the LED for the period B in which the operation of the switching regulator 2 is stopped. For this reason, there is a possibility that the output voltage of the switching regulator 2 might be reduced the moment there is carried out the transition from the period B to the period C.

The lighting control device 20 according to the third embodiment can suppress the reduction in the output voltage of the switching regulator 2 the moment there is carried out the transition from the period B to the period C.

Figure 7:
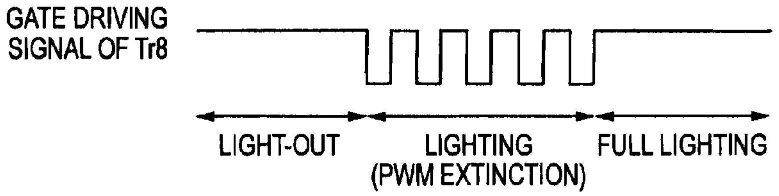
FIG. 7 is a signal timing diagram.
Figure 8:
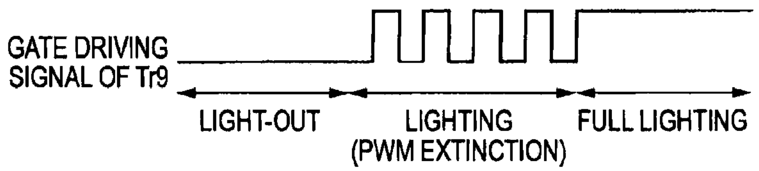
FIG. 8 is a signal timing diagram.

An operation of the lighting control device 20 according to the third embodiment will be described below. FIG. 7 is a diagram showing a gate driving signal of the NMOS transistor Tr8 to be the first switch portion and FIG. 8 is a diagram showing a gate driving signal of the NMOS transistor Tr9 to be the second switch portion.

When the LED is OFF, the lighting detecting portion 21 decides that the LED is OFF and sends a lighting decision signal having a low level. Accordingly, a lighting decision signal having a high level is input to one of the inputs of the OR circuit 23, and the lighting decision signal having the low level is input to one of the inputs of the AND circuit 24. The PWM extinction signal Sp having a low level is input to the other input of each of the OR circuit 23 and the AND circuit 24.

The OR circuit 23 sends a high level signal to the gate of the NMOS transistor Tr8 so that the NMOS transistor Tr8 carries out an ON operation (see FIG. 7). The AND circuit 24 sends a low level signal to the gate of the NMOS transistor Tr9 so that the NMOS transistor Tr9 carries out an OFF operation (see FIG. 8).

Then, the lighting detection is carried out, the PWM extinction signal Sp is sent and the PWM extinction is thus started. When the PWM extinction signal Sp has the low level (the low level in a lighting operation with the PWM extinction in FIGS. 7 and 8), the lighting detecting portion 21 decides that the LED is ON and sends the lighting decision signal having the high level. The lighting decision signal having the low level is input to one of the inputs of the OR circuit 23, and the lighting decision signal having the high level is input to one of the inputs of the AND circuit 24. The PWM extinction signal Sp having the low level is input to the other inputs of the OR circuit 23 and the AND circuit 24, respectively.

The OR circuit 23 sends a low level signal to the gate of the NMOS transistor Tr8 so that the NMOS transistor Tr8 carries out an OFF operation. The AND circuit 24 sends a low level signal to the gate of the NMOS transistor Tr9 so that the NMOS transistor Tr9 carries out an OFF operation.

Accordingly, the switching regulator 2 and the LED are disconnected from each other when the PWM extinction signal Sp has the low level, that is, for a period in which the LED current does not flow to the LED. Therefore, it is possible to prevent the smoothing capacitor C3 from being discharged.

In the case in which a contact failure is caused in the lighting control device 20 or the LED in a normal lighting (full lighting) operation, a wiring to the LED is once blocked. Since the switching regulator 2 is continuously operated, the voltage on both of the terminals of the smoothing capacitor C3 is raised. When the contact failure is recovered so that the wiring to the LED is connected, then the electric charges of the smoothing capacitor C3 having the voltage raised flow into the LED at a time. For this reason, there is a possibility that the LED might break down.

The lighting control device 20 according to the third embodiment can prevent a large current from flowing to the LED when the contact failure is caused.

A description will be given of the operation of the lighting control device 20 in the case in which the contact failure is caused.

When the contact failure is caused so that the wiring to the LED is blocked, the lighting detecting portion 21 decides that the LED is OFF and sends the lighting decision signal having the low level. Accordingly, the lighting decision signal having a high level is input to one of the inputs of the OR circuit 23 and the lighting decision signal having a low level is input to one of the inputs of the AND circuit 24. The PWM extinction signal Sp having the low level is input to the other inputs of the OR circuit 23 and the AND circuit 24, respectively.

The OR circuit 23 sends a high level signal to the gate of the NMOS transistor Tr8 so that the NMOS transistor Tr8 carries out an ON operation (see FIG. 7). The AND circuit 24 sends a low level signal to the gate of the NMOS transistor Tr9 so that the NMOS transistor Tr9 carries out an OFF operation (see FIG. 8).

When the contact failure is recovered so that the wiring to the LED is connected (in the full lighting operation of FIGS. 7 and 8), the NMOS transistor Tr8 carries out the ON operation and the electric charges of the smoothing capacitor C3 having the voltage raised flow into the resistor R12 so that the current to the LED is suppressed. Therefore, it is possible to prevent a failure of the LED, thereby enhancing a safety.

If the ON operation of the NMOS transistor Tr9 is set to be carried out late, furthermore, more excess electric charges are consumed by the resistor R12. Thus, it is possible to reliably prevent the failure of the LED.

Figure 9:
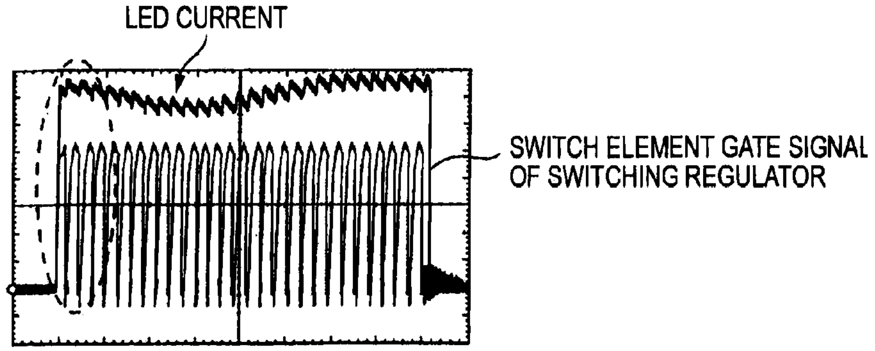
FIG. 9 is a signal timing diagram.

A method of suppressing a vertical oscillation of an LED current and a flicker of a light emission at the same time will be described below with reference to FIG. 9. FIG. 9 is a diagram showing waveforms of the LED current during a PWM extinction and a gate signal of a switch element in the switching regulator 2.

For example, in the case in which an extinction having a duty ratio of 5% is carried out at a frequency of one kilohertz (kHz), a period for which the LED current is caused to flow in one cycle of the PWM extinction signal Sp takes 50 microseconds (μs). In the example of FIG. 9, the number of times that the switch element of the switching regulator 2 carries out ON/OFF operations during one cycle of the PWM extinction signal Sp is approximately nine. As shown in FIG. 9, it is apparent that a state (a mark of a circle in a dotted line) in which the switching regulator 2 starts a driving operation greatly influences a value (a vertical oscillation) of the LED current.

The waveform of the gate signal is changed from a low level to a high level synchronously with the start of the driving operation of the switching regulator 2, and the switch element carries out the ON operation. By starting the driving and stopping operations of the switching regulator 2 in a timing in which the switch element carries out the ON operation, accordingly, it is possible to suppress the vertical oscillation of the LED current. Although an operation of the gate signal is performed by utilizing a leading edge of the PWM extinction signal Sp, the invention is not restricted thereto but the gate signal may be operated by another method.

A fourth embodiment according to the invention will be described below with reference to FIGS. 10 and 11.

In general, there has been known a PWM extinction method of carrying out flashing at a high speed (several hundreds hertz (Hz) to several kilohertz (kHz)) to reduce a mean current in the case in which an LED is subjected to an extinction. A PWM extinction signal is generated by comparing a sawtooth wave or a triangular wave with a predetermined reference voltage in the case in which a frequency or a duty is enabled to be set. It is assumed that the duty actually fluctuates between 4% to 6% if the duty is set to have a small value, for example, approximately 5% in order to shorten a time required for supplying a current. 6% is obtained by multiplying 4% by 1.5 so that a fluctuation ratio is increased. In the case in which the duty is thus set to have the small value, the fluctuation ratio is increased. For this reason, a flicker of a light emission is caused.

In the fourth embodiment, a lighting control device 1 is provided with a PWM extinction signal generating circuit 30 which will be described below. Consequently, it is possible to suppress the flicker of the light emission also in the case in which a duty is set to have a small value. The PWM extinction signal generating circuit 30 will be described below.

Figure 10:
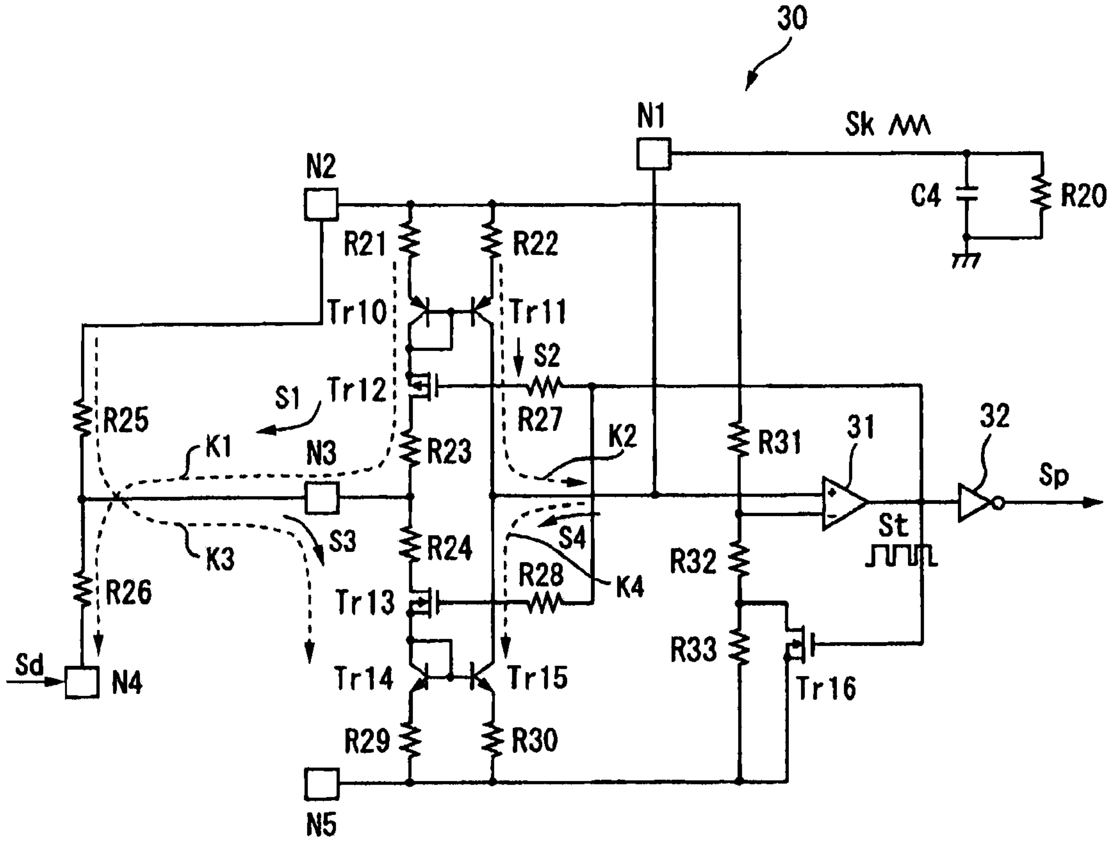
FIG. 10 illustrates an example of a signal generating circuit.
Figure 11:
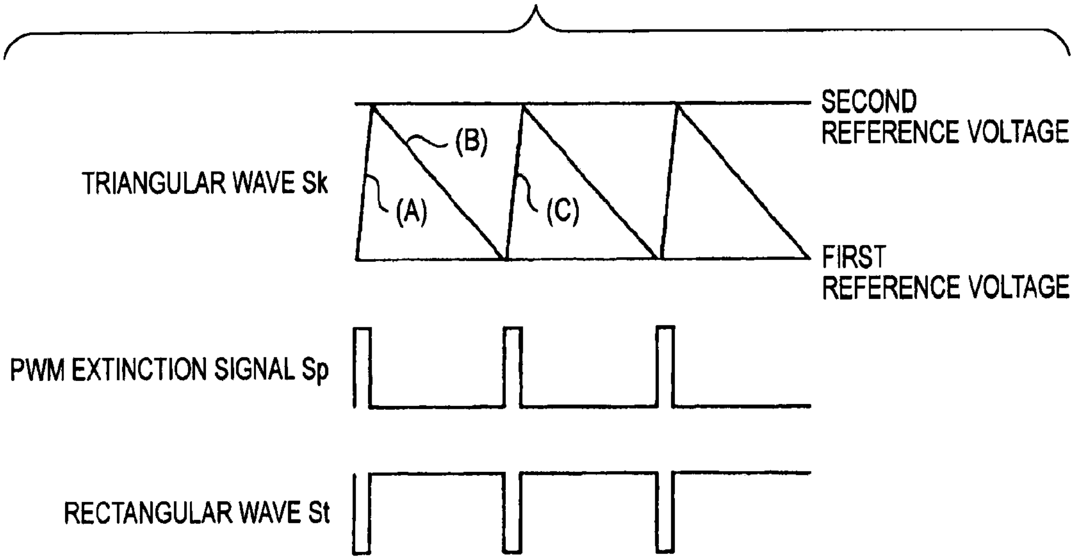
FIG. 11 is a signal timing diagram.

FIG. 10 is a diagram showing a structure of the PWM extinction signal generating circuit 30 for generating a PWM extinction signal Sp which is included in the lighting control device.

The PWM extinction signal generating circuit 30 includes a capacitor C4, resistors R20 to R33, nodes N1, N2, N4 and N5, a setting node N3, PNP transistors Tr10 and Tr11, a PMOS transistor Tr12, NMOS transistors Tr13 and Tr16, NPN transistors Tr14 and Tr15, a comparator 31, and an inverter 32. A node voltage of the node N2 is set to be a source voltage Vcc.

The capacitor C4 and the resistor R20 constitute a triangular wave generating circuit for generating a triangular wave Sk.

An inverting input of the comparator 31 is connected to a drain of the NMOS transistor Tr16 through the resistor R32. A non-inverting input of the comparator 31 is connected to the capacitor C4 and the resistor R20 through the node N1 and is connected to collectors of the PNP transistor Tr11 and the NPN transistor Tr15. An output of the comparator 31 is connected to a gate of the NMOS transistor Tr16.

The PNP transistor Tr10 has a source connected to the node N4 through the node N2, a drain connected to a source of the PMOS transistor Tr12, and a gate connected to a gate of the PNP transistor Tr11.

The PMOS transistor Tr12 has a drain connected to the node N4 through the setting node N3. An extinction setting signal Sd is input to the node N4.

The NMOS transistor Tr13 has a drain connected to the node N2 through the setting node N3 and a source connected to a collector and a gate of the NPN transistor Tr14 and a gate of the NPN transistor Tr15.

An emitter of the NPN transistor Tr14 and that of the NPN transistor Tr15 are connected to the node N5 through the resistor R29 and the resistor R30, respectively.

An operation of the PWM extinction signal generating circuit 30 will be described below. In FIG. 10, K1 and K2 denote current paths for charging currents S1 and S2 of the triangular wave Sk respectively, and K3 and K4 denote current paths for discharging currents S3 and S4 of the triangular wave Sk respectively.

A rectangular wave St is generated by regulating a time required for a charge/discharge which will be described below and carrying out a reciprocating operation between two reference voltages of the comparator 31 over the triangular wave Sk generated by charging/discharging operations of the capacitor C4 (see FIG. 11). The two reference voltages are switched by ON/OFF operations of the NMOS transistor Tr16 connected to an output side of the comparator 31.

In the charging operation, the NMOS transistor Tr16 is turned OFF so that one of the reference voltages which is higher (a second reference voltage in FIG. 11) is selected. In the example of FIG. 11, when a charging current (A) flows so that the second reference voltage is exceeded, switching into the discharge is carried out. In the charging operation, the output of the comparator 31 is set to have a low level.

In the discharging operation, the NMOS transistor Tr16 is turned ON so that one of the reference voltages which is lower (a first reference voltage in FIG. 11) is selected. In the example of FIG. 11, when a discharging current (B) flows so that the first reference voltage is not reached, switching into the charge is carried out. In the discharging operation, the output of the comparator 31 is set to have a high level. Then, the PWM extinction signal Sp shown in FIG. 11 is generated through the inverter 32 and an OR circuit (not shown).

In charging and discharging currents for forming a triangular wave required for generating the PWM extinction signal Sp having a duty of 50%, a time required for switching from a rise of the charging current into the discharging current and a speed (a charging speed) in the time are equal to a time required for switching from a fall of the discharging current to the charging current and a speed (a discharging speed) in the time. Accordingly, in the case in which the PWM extinction signal having a duty of 5% is generated, for example, it is necessary to set the charging speed of the charging current to be higher than the discharging speed as shown in FIG. 11.

The charging speed of the charging current and the discharging speed of the discharging current are set based on a resistance voltage dividing ratio of the resistors R25 and R26. A frequency of the PWM extinction signal Sp is set based on resistance values of the resistors R25 and R26. In other words, it is possible to set the charging speed of the charging current, the discharging speed of the discharging current and the frequency of the PWM extinction signal Sp through only the setting node N3.

By setting the value of the resistor R25 to be much greater than that of the resistor R26, accordingly, it is possible to set the charging speed of the charging current to be higher than the discharging speed. Therefore, it is possible to form the triangular wave Sk required for generating the PWM extinction signal Sp shown in FIG. 11.

As described above, according to the fourth embodiment, it is possible to set the speeds of the charging/discharging currents by connecting a resistance dividing voltage of the resistors R25 and R26 to the setting node N3. Consequently, it is possible to freely set the duty from 0% to 100%.

Moreover, there is generated the triangular wave Sk having the charging speed of the charging current which is higher than the discharging speed. Also in the case in which the duty of the PWM extinction signal Sp based on the triangular wave is set to have a small value, consequently, it is possible to suppress a flicker of a light emission because a fluctuation in the duty is small.

Figure 12:
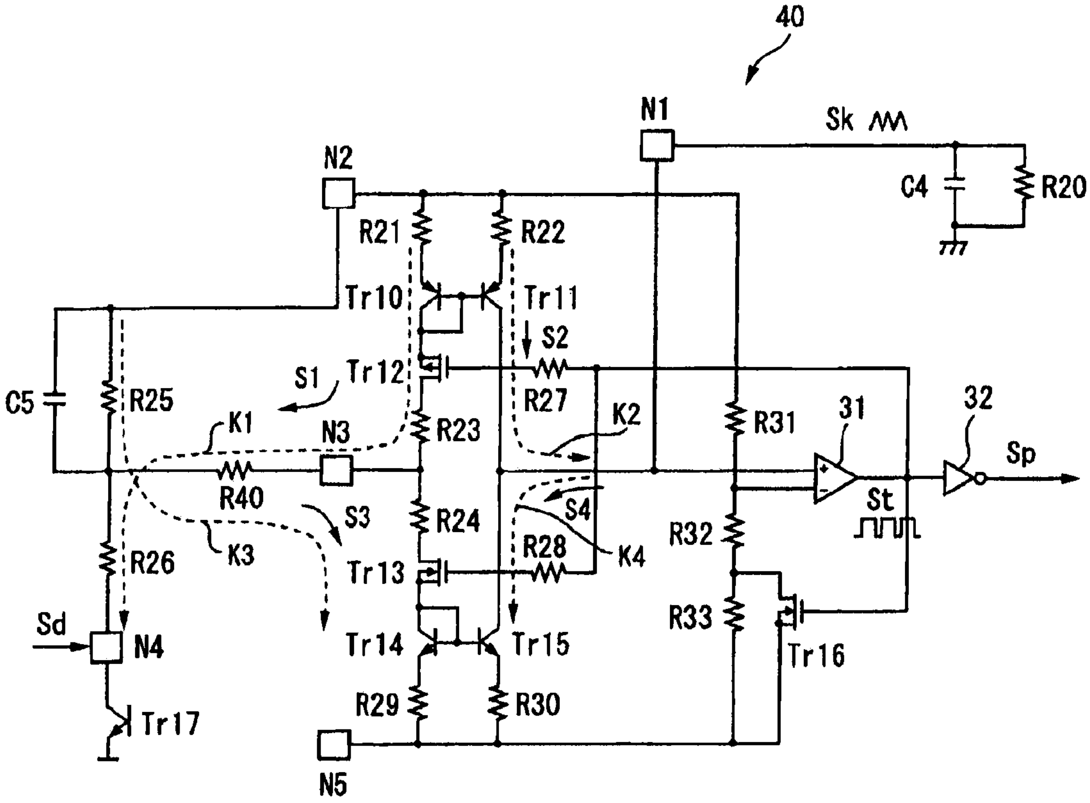
FIG. 12 illustrates an example of a signal generating circuit.

A fifth embodiment according to the invention will be described below with reference to FIG. 12. The fifth embodiment according to the invention includes a circuit 40 in which a resistor R40 is connected in series between a node N3 and a resistance voltage dividing point of resistors R25 and R26. Furthermore, a capacitor C5 is connected in parallel with the resistor R25 and an NPN transistor Tr17 is connected to a node N4. Since other details are the same as those in the fourth embodiment, accordingly, a description of those details will be omitted.

When the NPN transistor Tr17 carries out an OFF operation in response to an extinction setting signal Sd, the charging operation is not performed but only the discharging operation is executed. Consequently, an output of a comparator 31 has a low level and a PWM extinction signal Sp is fixed into a high level so that an LED is set into full lighting.

When the NPN transistor Tr17 carries out an ON operation in response to the extinction setting signal Sd, the capacitor C5 is set into a non-charging state. Therefore, a capacitor C4 is not charged. Then, the capacitor C5 is charged through the resistors R26 and R40 and resistance dividing voltages of the resistors R25 and R26 are gradually reduced from a source voltage Vcc so that the capacitor C4 is started to be charged. Subsequently, a duty of the PWM extinction signal Sp is gradually reduced from 100% to a duty set in a resistance ratio of the resistors R25 and R26.

When the NPN transistor Tr17 carries out the OFF operation in response to the extinction setting signal Sd, a reverse operation to the operation described above is executed. Consequently, the duty of the PWM extinction signal Sp is gradually raised from the set duty to the duty of 100% so that a change to the full lighting state of the LED is finally achieved.

Even if the node N4 is connected to a ground (GND), a PNP transistor (not shown) is connected between the resistor R25 and a node N2 (Vcc), the additional capacitor C5 is connected in parallel with the resistor R26 and a phase of the PWM extinction signal Sp is inverted, the same operation as described above is carried out.

As described above, according to the fifth embodiment, the start/stop of the PWM extinction can be controlled and a quantity of a light emitted from the LED can be gradually varied in a transition from the full lighting to the PWM extinction or a transition from the PWM extinction to the full lighting. Therefore, it is possible to enhance a safety in a driving operation of a vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A lighting control device of a lighting device for a vehicle, the lighting control device comprising:

a switching regulator for supplying a driving current to a semiconductor light source; and control means including a current detecting portion for detecting a voltage corresponding to the driving current and controlling dimming of the semiconductor light source to reduce a mean current of the driving current by repeating driving and stopping operations of the switching regulator at a high speed upon receipt of a dimming control signal, wherein the current detecting portion has a current holding portion for holding the driving current, which is detected during a driving period of the switching regulator, for a stopping period after a passage of the driving period.

2. The lighting control device of a lighting device for a vehicle according to claim 1, wherein the control means includes:

an error amplifier for comparing the voltage corresponding to the driving current with a predetermined reference voltage and carrying out a feedback control over an output of the switching regulator in such a manner that the voltage corresponding to the driving current is coincident with the reference voltage, and a capacitor and a resistor connected in parallel and disposed between an input and an output of the error amplifier, and wherein a capacitance component of the capacitor is opened and the error amplifier is short-circuited through the resistor for the stopping period of the switching regulator.

3. The lighting control device of a lighting device for a vehicle according to claim 1, wherein a first switch portion for conducting/disconnecting the semiconductor light source and the switching regulator is disposed between the semiconductor light source and the switching regulator, and wherein the control means is arranged to cause the first switch portion to carry out an OFF operation for the stopping period of the switching regulator.

4. The lighting control device of a lighting device for a vehicle according to claim 3, wherein the control means has a lighting detecting portion for deciding whether or not the semiconductor light source is turned ON based on a value of the driving current detected by the current detecting portion and sending a lighting detection signal, wherein a resistor is connected in series to the first switch portion, and a second switch portion is connected in parallel with the first switch portion and the resistor, and wherein the first switch portion and the second switch portion are arranged to carry out ON/OFF operations based on the lighting detection signal and the dimming control signal.

5. The lighting control device of a lighting device for a vehicle according to claim 1, wherein the driving and stopping operations of the switching regulator are started in a timing for causing a switch element of the switching regulator to carry out an ON operation.

6. The lighting control device of a lighting device for a vehicle according to claim 1, wherein the high speed is in a range of 200 Hz to 10 kHz.

* * * * *